United States Patent
Park et al.

(10) Patent No.: US 11,431,445 B2
(45) Date of Patent: Aug. 30, 2022

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd., Gyeonggi-do (KR)

(72) Inventors: Sung Jin Park, Gyeonggi-do (KR); Jeong Ho Yeo, Gyeonggi-do (KR); Ju Ho Lee, Gyeonggi-do (KR); Jin Young Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 52 days.

(21) Appl. No.: 16/647,694

(22) PCT Filed: Nov. 6, 2018

(86) PCT No.: PCT/KR2018/013379
§ 371 (c)(1),
(2) Date: Mar. 16, 2020

(87) PCT Pub. No.: WO2019/098587
PCT Pub. Date: May 23, 2019

(65) Prior Publication Data
US 2020/0274652 A1    Aug. 27, 2020

(30) Foreign Application Priority Data
Nov. 16, 2017   (KR) .................. 10-2017-0153324

(51) Int. Cl.
*H04J 3/16*     (2006.01)
*H04L 1/18*     (2006.01)
(Continued)

(52) U.S. Cl.
CPC .......... *H04L 1/1854* (2013.01); *H04L 1/1819* (2013.01); *H04L 5/0055* (2013.01); *H04W 72/1273* (2013.01); *H04W 72/1289* (2013.01)

(58) Field of Classification Search
USPC ....... 370/229, 230, 242, 252, 328, 329, 330, 370/376, 395.4, 458, 468
See application file for complete search history.

(56) References Cited

U.S. PATENT DOCUMENTS 8,130,707 B2   3/2012  Iwai et al.
8,402,336 B2   3/2013  McBeath et al.
(Continued)

FOREIGN PATENT DOCUMENTS

EP      3 574 599        12/2019
KR     1020170093068      8/2017
(Continued)

OTHER PUBLICATIONS

Vivo, "Design of Group-Common PDCCH", R1-1717485, 3GPP TSG RAN WG1 NR Meeting 90bis, Oct. 9-13, 2017, 10 pages (Year: 2017).*
(Continued)

*Primary Examiner* — Nguyen H Ngo
(74) *Attorney, Agent, or Firm* — The Farrell Law Firm, P.C.

(57) ABSTRACT

The present disclosure relates to a method and apparatus for receiving control information in a wireless communication system, and the method of receiving control information may include: receiving scheduling configuration information; receiving slot format information; determining formats of at least one slot based on scheduling configuration information and the slot format information; and receiving, based on a result of the determining, at least one of first type control information and second type control information.

10 Claims, 12 Drawing Sheets

(51) Int. Cl.
  *H04L 5/00*  (2006.01)
  *H04W 72/12*  (2009.01)

(56) References Cited

U.S. PATENT DOCUMENTS

| | | | |
|---|---|---|---|
| 2013/0136053 A1 | 5/2013 | Kim et al. | |
| 2017/0347352 A1* | 11/2017 | Luo | H04W 72/0413 |
| 2018/0199268 A1* | 7/2018 | Wang | H04L 5/0053 |
| 2018/0234968 A1* | 8/2018 | Sun | H04W 72/042 |
| 2018/0279304 A1* | 9/2018 | Lee | H04W 72/042 |
| 2018/0309513 A1* | 10/2018 | Kim | H04W 72/0446 |
| 2018/0317255 A1 | 11/2018 | Um et al. | |
| 2019/0037495 A1* | 1/2019 | John Wilson | H04W 56/001 |
| 2019/0045495 A1* | 2/2019 | Chen | H04L 5/0007 |
| 2019/0082431 A1* | 3/2019 | Yi | H04L 5/0057 |
| 2020/0059904 A1* | 2/2020 | Takeda | H04W 72/042 |
| 2020/0374909 A1* | 11/2020 | Takeda | H04W 72/0453 |
| 2021/0184802 A1* | 6/2021 | Höglund | H04L 1/1822 |

FOREIGN PATENT DOCUMENTS

| | | |
|---|---|---|
| KR | 1020180113244 | 10/2018 |
| WO | WO 2018/138321 | 8/2018 |

OTHER PUBLICATIONS

Intel Corporation, "On Group-Common PDCCH", R1-1717380, 3GPP TSG RAN WG1 Meeting #90bis, Oct. 9-13, 2017, 11 pages.
European Search Report dated Oct. 12, 2020 issued in counterpart application No. 18879637.9-1205, 14 pages.
Vivo, "Design of Group-Common PDCCH", R1-1717485, 3GPP TSG RAN WG1 NR Meeting 90bis, Oct. 9-13, 2017, 10 pages.
Spreadtrum Communications, "The Relation among UE-Specific DCI, GC-PDCCH, and Semi-Static Signaling", R1-1713057, 3GPP TSG RAN WG1 Meeting #90, Aug. 21-25, 2017, 4 pages.
International Search Report dated Feb. 15, 2019 issued in counterpart application No. PCT/KR2018/013379, 20 pages.
Ericsson, "Summary of Email Discussion on 2 HARQ", R2-1700757, XP051211466, 3GPP TSG-RAN WG2 #97, Feb. 13-17, 2017, 10 pages.
European Search Report dated Feb. 5, 2021 issued in counterpart application No. 18879637.9-1205, 14 pages.
Indian Examination Report dated Mar. 25, 2022 issued in counterpart application No. 202037011360, 6 pages.

* cited by examiner ns a detailed flowchart of a method of receiving
METHOD AND APPARATUS FOR TRANSMITTING AND RECEIVING CONTROL INFORMATION IN WIRELESS COMMUNICATION SYSTEM

TECHNICAL FIELD

The present disclosure relates to a wireless communication system, and more particularly, to a method and apparatus for transmitting and receiving control information so that a service is smoothly provided.

BACKGROUND ART

Efforts have been made to develop an improved 5$^{th}$ generation (5G) communication system or pre-5G communication system to keep up with growing wireless data traffic demands after the commercialization of 4$^{th}$ generation (4G) communication systems. For this reason, the 5G or pre-5G communication system is called a beyond a 4G network communication system or a post long-term evolution (LTE) system. Implementation of 5G communication systems in an ultra-high frequency (millimeter wave (mmW)) band (such as a 60-GHz band) is under consideration to achieve high data transfer rates. To mitigate path loss and increase transmission distance during radio wave propagation in an ultra-high frequency band for 5G communication systems, various technologies such as beamforming, massive multiple-input multiple-output (MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. Furthermore, for 5G systems, advanced coding modulation (ACM) schemes such as Hybrid FSK and QAM Modulation (FQAM) and SWSC (Sliding Window Superposition Coding) and advanced access techniques such as Filter Bank Multicarrier (FBMC), non-orthogonal multiple access (NOMA), sparse code multiple access (SDMA), etc. are being developed.

Moreover, the Internet has evolved from a human-centered connection network, in which humans create and consume information, to the Internet of things (IoT) network in which dispersed components such as objects exchange information with one another to process the information. The Internet of Everything (IoE) technology has emerged, in which the IoT technology is combined with, for example, technology for processing big data through connection with a cloud server. To implement the IoT, technologies such as a sensing technique, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for a human life by collecting and analyzing data obtained from interconnected objects. The IoT can be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, sensor networks, M2M communication, and MTC technologies are implemented using 5G communication technologies including beamforming, MIMO, and array antennas. The application of the above-described Cloud RAN as a big data processing technology is an example of convergence between the 5G and IoT technologies.

Because various services may be provided due to the aforementioned technical features and the development of wireless communication systems, a method of smoothly providing the services is required

DESCRIPTION OF EMBODIMENTS

Technical Problem

The disclosed embodiments provide a method and apparatus for transmitting and receiving control information so that a service may be smoothly provided in a wireless communication system.

Solution to Problem

Uplink or downlink control information is effectively provided according to embodiments of the present disclosure.

Advantageous Effects of Disclosure

According to the present disclosure, control information may be efficiently transmitted and received in a wireless communication system.

BEST MODE

Figure 1:
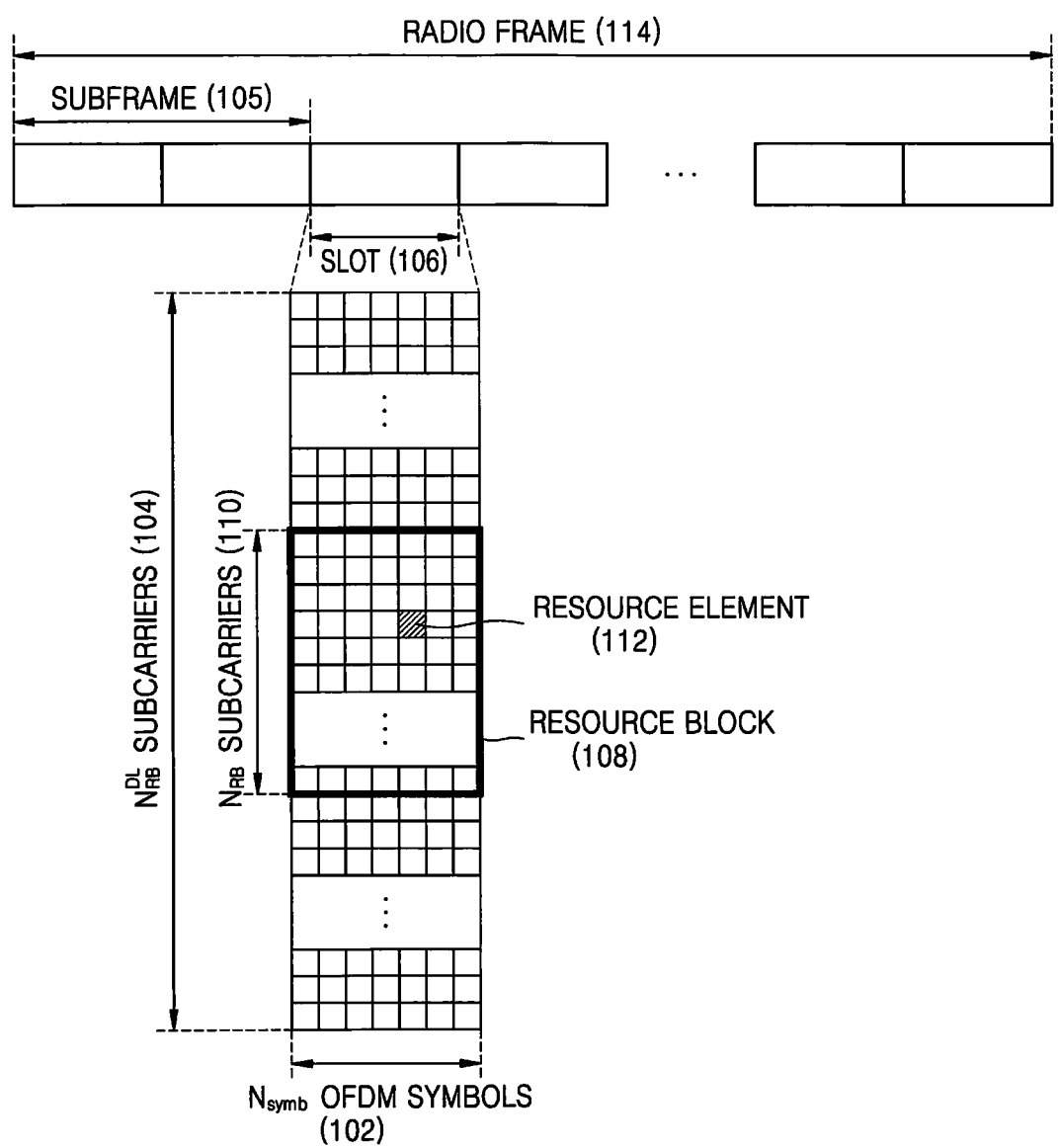
FIG. 1 illustrates a downlink time-frequency domain transmission structure in a long term evolution (LTE) or LTE-advanced (LTE-A) system or a similar system.

According to an embodiment of the present disclosure, a method of receiving control information includes: receiving scheduling configuration information; receiving slot format information; determining formats of at least one slot based on scheduling configuration information and the slot format information; and receiving, based on a result of the determining, at least one of first type control information and second type control information.

The determining of the formats may include determining, based on the slot format information, formats of at least one slot available for uplink or downlink scheduling determined based on the scheduling configuration information.

The receiving of the at least one of the first type control information and the second type control information may include receiving only one of the first type control information and the second type control information when the formats of the at least one slot available for the uplink or downlink scheduling are determined as the same format based on the slot format information.

The receiving of the at least one of the first type control information and the second type control information may include: when the formats of the at least one slot available for the downlink scheduling are all determined as uplink formats based on the slot format information, receiving only the first type control information; and when the formats of the at least one slot available for the uplink scheduling are all determined as downlink formats based on the slot format information, receiving only the second type control information.

The receiving of the at least one of the first type control information and the second type control information may include receiving the first type control information and the second type control information when formats of at least one slot available for the uplink scheduling are all determined as uplink formats based on the slot format information, or formats of at least one slot available for the downlink scheduling are all determined as downlink formats based on the slot format information.

The receiving of the at least one of the first type control information and the second type control information may include receiving the first type control information and the second type control information when the formats of the at least one slot available for the uplink or downlink scheduling are determined as different formats based on the slot format information.

The receiving of the at least one of the first type control information and the second type control information may include receiving the first type control information and the second type control information when formats of at least one slot among a predetermined number of slots available for the uplink or downlink scheduling are unknown.

The determining of the formats may include, in at least one of cases in which the slot format information includes information indicating that a format of a predetermined slot is unknown and in which the slot format information does not include information about the format of the predetermined slot, determining the format of the predetermined slot as an unknown format.

According to another embodiment of the present disclosure, a method of receiving control information includes: acquiring hybrid automatic repeat request (HARQ) process configuration information; identifying the number of HARQ processes currently being performed; acquiring information about the number of remaining HARQ processes based on the HARQ process configuration information and the identified number of HARQ processes being performed; and selectively receiving scheduling control information based on the acquired information about the number of remaining HARQ processes.

The acquiring of the HARQ process configuration information may include acquiring the HARQ process configuration information based on at least one of performance information of a user equipment and information received from a base station.

The identifying of the number of HARQ processes currently being performed may include identifying the number of HARQ processes currently being performed based on whether HARQ acknowledgement (HARQ-ACK) or uplink data is transmitted.

The selective receiving of the scheduling control information may include receiving control information when the number of remaining HARQ processes is 1 or more.

According to another embodiment of the present disclosure, a user equipment for receiving control information in a wireless communication system includes: a transceiver configured to communicate with a base station; and a processor configured to receive scheduling configuration information, receive slot formation information, determine formats of at least one slot based on the scheduling configuration information and the slot format information; and receive, based on a result of the determining, at least one of first type control information and second type control information.

The processor may determine, based on the slot format information, formats of at least one slot available for uplink or downlink scheduling determined based on the scheduling configuration information.

The processor may receive only one of the first type control information and the second type control information when the formats of the at least one slot available for the uplink or downlink scheduling are determined as the same format based on the slot format information.

The processor may receive only the first type control information when formats of at least one slot available for the downlink scheduling are all determined as uplink formats based on the slot format information, and receive only the second type control information when formats of at least one slot available for the uplink scheduling are all determined as downlink formats based on the slot format information.

The processor may receive the first type control information and the second type control information when the formats of the at least one slot available for the uplink scheduling are all determined as uplink formats based on the slot format information, or the formats of the at least one slot available for the downlink scheduling are all determined as downlink formats based on the slot format information.

The processor may receive the first type control information and the second type control information when the formats of the at least one slot available for the uplink or downlink scheduling are determined as different formats based on the slot format information.

The processor may receive the first type control information and the second type control information when formats of at least one slot among a predetermined number of slots available for the uplink or downlink scheduling are unknown.

According to another embodiment of the disclosure, a user equipment for receiving control information in a wireless communication system includes: a transceiver configured to communicate with a base station; and a processor configured to acquire HARQ process configuration information; identify the number of HARQ processes currently being performed, acquire information about the number of remaining HARQ processes based on the HARQ process configuration information and the identified number of HARQ processes being performed, and selectively receive scheduling control information based on the acquired information about the number of remaining HARQ processes.

MODE OF DISCLOSURE

Hereinafter, operation principles of the disclosure will be described in detail with reference to the accompanying drawings.

In the following description of embodiments, descriptions of technical features that are well known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth herein. Rather, the embodiments of the present disclosure are provided so that the disclosure will be thorough and complete and will fully convey the concept of the disclosure to those of ordinary skill in the art, and the present disclosure will only be defined by the appended claims. Throughout the specification, like reference numerals refer to like elements.

It will be understood that each block of the flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed via the processor of the computer or other programmable data processing equipment create a means for performing functions specified in the flowchart block(s). The computer program instructions may also be stored in a computer-usable or computer-readable memory capable of directing a computer or another programmable data processing apparatus to implement functions in a specific manner, and thus, the instructions stored in the computer-usable or computer-readable memory may produce an article of manufacture including the instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, according to an embodiment, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, according to an embodiment, the "unit" may include one or more processors.

Wireless communication systems have progressed beyond providing initial voice-centered services into broadband wireless communication systems that provide high-speed, high-quality packet data services based on communication standards such as $3^{rd}$ Generation Partnership Project (3GPP)'s High Speed Packet Access (HSPA), Long Term Evolution (LTE) or Evolved Universal Terrestrial Radio Access (E-UTRA), and LTE-Advanced (LTE-A), 3GPP2's High Rate Packet Data (HRPD) and Ultra Mobile Broadband (UMB), and IEEE's 802.16e. Furthermore, $5^{th}$ generation (5G) or new radio (NR) communication standards are being developed for 5G wireless communication systems.

Implementation of 5G communication systems in an ultra-high frequency (millimeter wave (mmW)) band (such as a 60-GHz band) is under consideration to achieve high data transmission rates. To mitigate path loss and increase transmission distance during radio wave propagation in the ultra-high frequency band for 5G communication systems, technologies including beamforming, massive multiple-input multiple-output (MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. In addition, for 5G systems, advanced coding modulation (ACM) schemes such as Hybrid FSK and QAM Modulation (FQAM) and SWSC (Sliding Window Superposition Coding) and advanced access techniques such as Filter Bank Multicarrier (FBMC), non-orthogonal multiple access (NOMA), sparse code multiple access (SDMA), etc. are being developed.

Moreover, the Internet has evolved from a human-centered connection network, in which humans create and consume information, to the Internet of things (IoT) network in which dispersed components such as objects exchange information with one another to process the information. The Internet of Everything (IoE) technology has emerged, in which the IoT technology is combined with, for example, technology for processing big data through connection with a cloud server. To implement the IoT, technologies such as a sensing technique, a wired/wireless communication and network infrastructure, a service interface technology, and a security technology are required. Thus, research has recently been conducted into technologies such as sensor networks for interconnecting objects, machine to machine (M2M) communication, and machine type communication (MTC). In the IoT environment, intelligent Internet technology services may be provided to create new values for a human life by collecting and analyzing data obtained from interconnected objects. The IoT may be applied to various fields such as a smart home, a smart building, a smart city, a smart car or connected car, a smart grid, health care, a smart home appliance, an advanced medical service, etc., through convergence and integration between existing information technology (IT) and various industries.

Thus, various attempts are being made to apply a 5G communication system to the IoT network. For example, sensor networks, M2M communication, and MTC technologies are implemented using 5G communication technologies including beamforming, MIMO, and array antennas. The application of the above-described Cloud RAN as a big data processing technique is an example of convergence between the 5G and IoT technologies.

In wireless communication systems including the 5G wireless communication systems as described above, at least one service from among enhanced mobile broadband (eMBB), massive machine type communications (mMTC), and ultra-reliable and low-latency communications (URLLC) services may be provided to a terminal. The above-described services may be provided to the same or different terminal during the same time period. According to an embodiment, the eMBB service may aim at high-speed transmission of high-capacity data, the mMTC service may aim to minimize terminal power and provide connection to multiple terminals, and the URLLC service may aim at high reliability and low delay, but are not limited thereto. Furthermore, the services may be fundamental scenarios for systems such as LTE systems or post-LTE 5G/new radio or next radio (NR) systems.

A base station may schedule eMBB data corresponding to the eMBB service to a specific terminal in a certain transmission time interval (TTI). When a situation occurs in which the base station needs to transmit URLLC data corresponding to the URLLC service during the TTI, the base station may transmit the URLLC data without transmitting a part of the emBB data in a frequency band in which the eMBB data is already scheduled and transmitted. In this case, the terminal to which the eMBB is scheduled may be identical to or different from a terminal to which the URLLC is scheduled. In this case, because there may be a time interval when some or all of the eMBB data that has already been scheduled and transmitted may not be transmitted, the eMBB data is more likely to be damaged. Thus, there may be a need for a method of providing various services together in a communication system. However, the above mMTC, URLLC, and eMBB are merely examples of different service types, and service types to which the present embodiment is applied are not limited to the above-described examples.

A reference signal (or RS) is a signal used for measuring states of a channel between a base station and users, such as channel strength and distortion, interference strength, and Gaussian noise, to facilitate demodulation and decoding of received data symbols. According to an embodiment, the reference signal may also be used to measure the state of a radio channel. A receiver may determine the state of a radio channel between the receiver and a transmitter by measuring a signal strength of the reference signal received via the radio channel after being transmitted at predetermined transmission power. The state of the radio channel is used to determine the data rate the receiver requested from the transmitter.

In a general mobile communication system having limited radio resources such as time, frequency, and transmission power that a signal is to be transmitted, it may be difficult to allocate a large amount of radio resources for transmitting a reference signal. In other words, when the more radio resources are allocated for the reference signal, the amount of resources to be allocated for a data signal is reduced. Thus, the amount of radio resources to be allocated for a reference signal should be determined appropriately considering a system throughput. Allocation and measurement of radio resources for a reference signal is of great importance in particular when adopting a multiple-input multiple-output (MIMO) technology that uses multiple antennas for transmission and reception.

In a 5G system, the entire system frequency band in which a base station can operate may be the same as or different from a frequency band in which the terminal can operate. When the system frequency band is different from the frequency band for the terminal, the base station may support the terminal to instruct transmission and reception of downlink or uplink data in each specific frequency band. This concept is called a bandwidth part (BWP), and the terminal may receive a plurality of BWP candidates on which the terminal may operate in the system frequency band, and use one or the plurality of BWPs for transmission or reception of uplink or downlink data.

Furthermore, similar to LTE, in the 5G system, radio resources may be configured for semi-persistent scheduling (SPS) in both the uplink and the downlink. Radio resources may be configured for traffic with periodic transmissions, such as voice over Internet protocol (VoIP), or for emergency services such as URLLC. Furthermore, radio resources may be periodically pre-allocated for grant-free transmission other than the SPS. The terminal may transmit (or receive) data without receiving control information including (granting) separate uplink data scheduling information in the resources pre-allocated for the grant-free transmission. Embodiments are not limited to the above example.

According to an embodiment of the present disclosure, when detecting for scheduling control information related to an uplink or downlink via a downlink control channel, the terminal may consider using a method of adaptively detecting for scheduling control information according to a slot format indicator (SFI) information indicating slot format information in a time division duplex (TDD) environment. For example, when an SFI indicates that subsequent slots are successive uplink slots, the terminal may not need to detect for control information for scheduling downlink data. In such a situation, when a preset control information format is determined to be for uplink or downlink scheduling and scheduling control information is all found, the terminal may consume a large amount of power.

Furthermore, it may be inefficient to detect for control information for scheduling downlink or uplink data, regardless of the number (resources) of Hybrid Automatic Repeat Request (HARQ) processes that can be used by the terminal. When only one HARQ process can be used by the terminal for downlink data scheduling, the terminal may not need to detect for control information indicating downlink data scheduling until reporting HARQ acknowledgement (HARQ-ACK) for downlink data after receiving scheduling of the downlink data with the one HARQ process. In other words, it may be possible to adaptively detect for control information for scheduling downlink or uplink data according to the number of HARQ processes that can be used by the terminal for downlink data scheduling. Thus, the present disclosure may provide a method and apparatus for adaptively detecting for and receiving control information.

Hereinafter, embodiments of the present disclosure will be described in detail with reference to the accompanying drawings. In the following descriptions of the disclosure, related functions or configurations are not described in detail because they would obscure the disclosure with unnecessary details. The terms used in the present specification are defined in consideration of functions in the present disclosure, and may be changed according to a user's or operator's intent, or practices. Thus, definitions of the terms should be made on the basis of the entire description of the present specification. Hereinafter, a base station is an entity that allocates resources to a terminal, and may be at least one of a gNode B, an eNode B, a Node B, a BS, a wireless access unit, a BS controller, and a network node. A terminal may include a user equipment (UE), a mobile station (MS), a cellular phone, a smart phone, a computer, or a multimedia system capable of performing a communication function. In the present specification, a downlink (DL) refers to a radio transmission path via which a BS transmits a signal to a UE (or terminal), and an uplink (UL) refers to a radio transmission path via which the UE transmits a signal to the BS. Although embodiments of the disclosure are hereinafter described as an example of an LTE or LTE-LTE-A system, the embodiments of the disclosure may be applied to other communication systems having similar technical backgrounds and channel configurations. For example, a 5G mobile communication technology (5G or NR) developed after LTE-A may be included therein. Furthermore, it should be understood by those skilled in the art that the embodiments of the disclosure are applicable to other communication systems through modifications not departing from the scope of the disclosure.

As a representative example of the broadband wireless communication system, an LTE system adopts orthogonal frequency division multiplexing (OFDM) scheme in a DL and single carrier frequency division multiple access (SC-FDMA) in a UL. The UL refers to a radio link through which a UE (or terminal) or a mobile station (MS) transmits data or a control signal to a BS (or gNode B), and the DL refers to a radio link through which the BS transmits data or control signal to the UE. In the multiple access scheme as described above, data or control information of each user may be distinguished by allocating and operating time-frequency resources carrying data or control information for each user to prevent overlapping i.e., maintain orthogonality therebetween.

The LTE system adopts a HARQ method by which data is retransmitted in a physical layer when decoding of the data fails in an initial transmission. According to the HARQ method, when a receiver is unable to correctly decode data, the receiver transmits a negative acknowledgement (NACK) indicating the decoding failure to a transmitter so that the transmitter may retransmit the corresponding data in the physical layer. The receiver combines the data retransmitted by the transmitter with the data for which decoding has failed to improve data reception performance. In addition, when the receiver correctly decodes the data, the receiver may transmit an ACK indicating the decoding success to the transmitter so that the transmitter may transmit new data.

FIG. 1 illustrates a DL time-frequency domain transmission structure in an LTE or LTE-A system or a similar system.

Referring to FIG. 1, in a radio resource region, the abscissa represents a time domain and the ordinate represents a frequency domain. The smallest transmission unit in the time domain is an OFDM symbol, the number of $N_{symb}$ OFDM symbols 102 are collected to form a slot 106, and two slots are combined into a subframe 105. In this case, a slot length may be 0.5 ms, and a subframe length may be 1.0 ms. A radio frame 114 may be a time domain interval composed of 10 subframes. The smallest transmission unit in the frequency domain is a subcarrier, and the entire system transmission bandwidth is composed of a total of $N_{RB}^{DL}$ subcarriers 104. However, these specific values may be applied variably according to a system. For example, a 5G or NR system may support two types of slot structures, i.e., a slot and a mini-slot (or non-slot). For a slot used in the 5G or NR system, the number $N_{symb}$ of OFDM symbols may be set to one of 7 and 14, and for a mini-slot in the 5G or NR system, the number $N_{symb}$ of OFDM symbols may be set to one of 1, 2, 3, 4, 5, 6, and 7.

The smallest resource unit in the time-frequency domain is a resource element (RE) 112 that may be represented by an OFDM symbol index and a subcarrier index. A resource block (RB) 108 (or physical resource block (PRB)) may be defined as $N_{symb}$ consecutive OFDM symbols 102 in the time domain and $N_{RB}$ consecutive sub-carriers 110 in the frequency domain. Thus, the RB 108 in each slot may consist of $N_{symb} \times N_{RB}$ REs 112.

An RB is a minimum data allocation unit in the frequency domain. In an LTE system, generally, $N_{symb}=7$ and $N_{RB}=12$, and $N_{BW}$ and the $N_{RB}$ may be proportional to the system transmission bandwidth. A data rate increases in proportion to the number of RBs scheduled for a UE.

The LTE system may define and operate six (6) transmission bandwidths. In an FDD system in which the DL and UL are separated based on a frequency, a DL transmission bandwidth may be different from a UL transmission bandwidth. A channel bandwidth represents a radio frequency (RF) bandwidth corresponding to the system transmission bandwidth. The following Table 1 shows a correspondence relationship between the system transmission bandwidth and the channel bandwidth defined in the LTE system. For example, in the LTE system having a channel bandwidth of 10 MHz, a transmission bandwidth may include fifty (50) RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information (DCI) may be transmitted within first N OFDM symbols in a subframe. According to an embodiment, generally, N={1, 2, 3}. Thus, the value of N may vary per subframe depending on the amount of control information to be transmitted in the current subframe. The control information to be transmitted may include a control channel transmission interval indicator indicating how many OFDM symbols the control information is transmitted over, scheduling information for DL or UL data, and information about HARQ ACK/NACK. In the LTE system, the scheduling information for the DL or UL data is transmitted from a BS to the UE through DCI. Various DCI formats may be defined, and each DCI format may represent whether the DCI is scheduling information (UL grant) for the UL data or scheduling information (DL grant) for the DL data, whether the DCI is a compact DCI having a small size of control information, whether the DCI applies spatial multiplexing using multiple antennas, whether the DCI is a DCI for power control, etc. For example, DCI format 1 that is scheduling control information (DL grant) for the DL data may include at least one of the following pieces of control information.

Resource allocation type 0/1 flag: This indicates whether a resource allocation scheme is type 0 or type 1. The type 0 applies a bitmap scheme to allocate resources in units of a resource block group (RBG). In the LTE system, a basic unit of scheduling is an RB represented as a time-frequency resource, and an RBG includes a plurality of RBs and is a basic unit of scheduling in the type 0 scheme. The type 1 is used to allocate a specific RB within an RBG.

Resource block allocation: This indicates an RB assigned for data transmission. Resources indicated by resource block assignment is determined according to a system bandwidth and a resource allocation scheme.

Modulation and coding scheme (MCS): This indicates a modulation scheme used for data transmission and a size of a transport block that is data to be transmitted.

HARQ process number: This indicates of the number of HARQ processes.

New data indicator: This indicates either HARQ initial transmission or retransmission.

Redundancy version:

This indicates a redundancy version of HARQ.

Transmit power control (TPC) command for a physical UL control channel (PUCCH): This indicates a TPC command for a PUCCH that is a UL control channel.

According to an embodiment, DCI may undergo channel coding and modulation process and then be transmitted on a physical DL control channel (PDCCH or control information hereinafter to be used interchangeably), which is a DL control channel, or an enhanced PDCCH (EPDCCH or enhanced control information hereinafter to be used interchangeably). Embodiments are not limited to the above example.

According to an embodiment, each DCI may be independently scrambled by a specific radio network temporary identifier (RNTI or a UE identifier (ID)) for each UE, be attached with a cyclic redundant check (CRC), undergo channel coding, and then be configured as an independent PDCCH for transmission. In the time domain, the PDCCH may be mapped and transmitted during a control channel transmission interval. A location where the PDCCH is mapped in the frequency domain may be determined by an ID of each UE, and the PDCCH to be transmitted may be spread over the entire system transmission bandwidth.

The DL data may be transmitted on a physical downlink shared channel (PDSCH) that is a physical channel for transmission of DL data. The PDSCH may be transmitted after the control channel transmission interval, and scheduling information such as a specific mapping location in the frequency domain, a modulation scheme, etc. is determined based on a DCI transmitted through a PDCCH.

By using MCS in control information constituting the DCI, the BS notifies the UE about a modulation scheme applied to the PDSCH to be transmitted to the UE and a size of data to be transmitted (transport block size (TBS)). According to some embodiment, the MCS may consist of five (5) bits or more or fewer bits. The TBS corresponds to a size of a transport block (TB) before channel coding for error correction is applied to TB to be transmitted by the BS.

Modulation schemes supported in the LTE system are quadrature phase shift keying (QPSK), 16 quadrature amplitude modulation (QAM), and 64QAM for which the modulation orders Qm correspond to 2, 4, and 6, respectively. That is, in QPSK, 2 bits per symbol may be transmitted, while in 16 QAM and 64QAM, 4 and 6 bits per symbol may be transmitted, respectively. Furthermore, higher order modulation schemes than 256QAM may be used depending on system variations.

Figure 2:
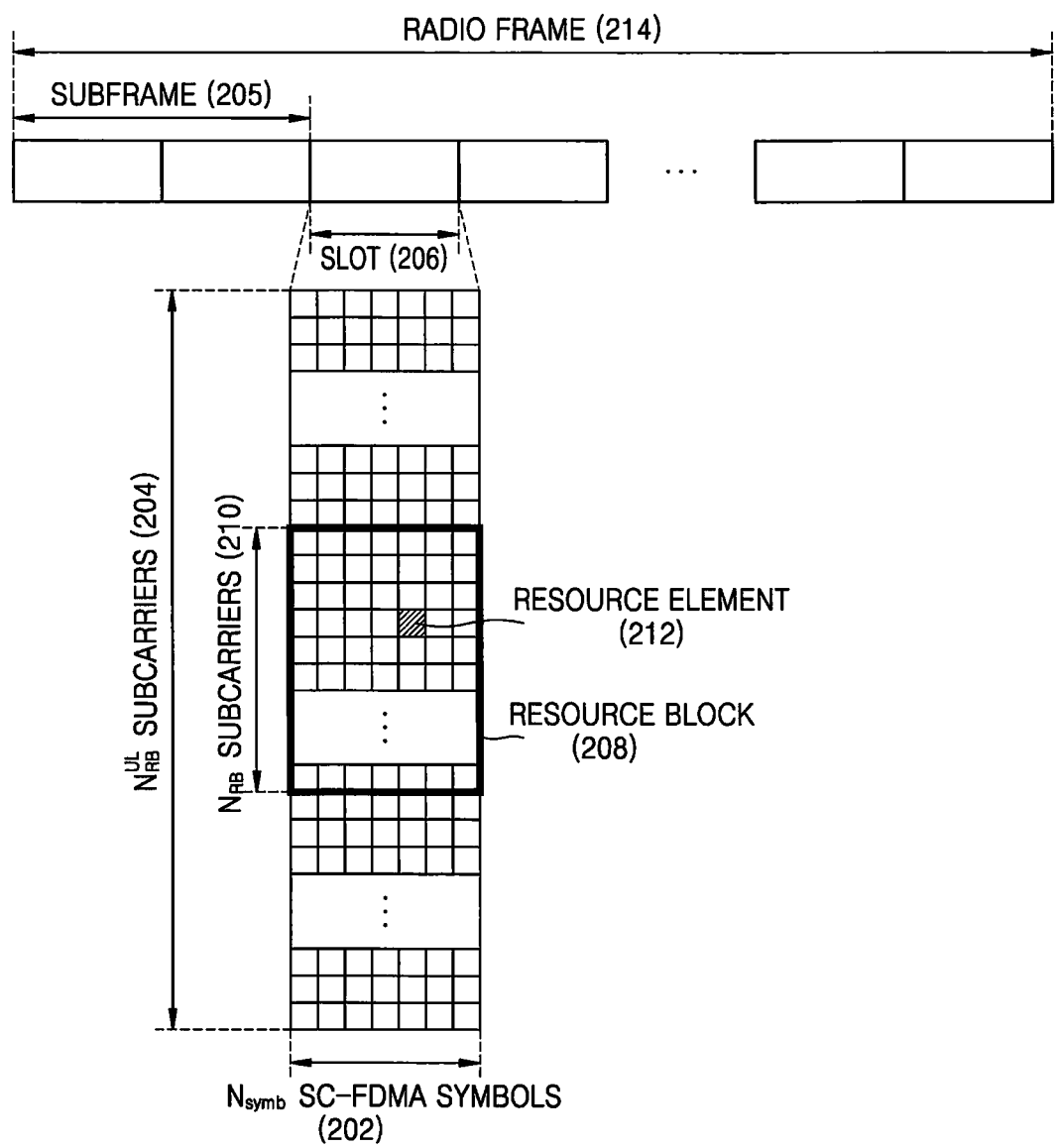
FIG. 2 illustrates an uplink time-frequency domain transmission structure in an LTE or LTE-A system or a similar system.

FIG. 2 illustrates a time-frequency domain transmission structure that is a radio resource region in a UL for an LTE or LTE-A system or a similar system.

Referring to FIG. 1, in the radio resource region, the abscissa represents a time domain and the ordinate represents a frequency domain. The smallest transmission unit in the time domain is an SC-FDMA symbol, and the number of $N_{symb}$ SC-FDMA symbols 202 are collected to form a slot 206. Two slots are gathered to form a subframe 205. The smallest transmission unit in the frequency domain is a subcarrier, and the entire system transmission bandwidth is composed of a total of $N_{RB}^{DL}$ subcarriers 204. $N_{RB}^{DL}$ may have a value proportional to the system transmission bandwidth.

The smallest resource unit in the time-frequency domain is an RE 212 that may be defined as an SC-FDMA symbol index and a subcarrier index. An RB pair 208 may be defined as $N_{symb}$ consecutive SC-OFDM symbols 202 in the time domain and $N_{RB}$ consecutive sub-carriers 210 in the frequency domain. Thus, one RB may consist of $N_{symb} \times N_{RB}$ REs. In general, an RB is the smallest unit of transmission of data or control information. A PUCCH is mapped to the frequency domain corresponding to one RB and transmitted in one subframe.

In the LTE system, it is possible to define a relationship between a PDSCH as a physical channel for DL data transmission or PDCCH/EPDCCH including a semi-persistent scheduling (SPS) release and a PUCCH or a physical uplink shared channel (PUSCH) that is an uplink physical channel on which HARQ ACK/NACK corresponding to the PDSCH or PDCCH/EPDCCH is transmitted. For example, in the LTE system operating in FDD mode, HARQ ACK/NACK corresponding to a PDSCH or PDCCH/EPDCCH including an SPS release, transmitted in an n-4-th subframe, may be transmitted on a PUCCH or PUSCH in an n-th subframe.

The LTE system adopts an asynchronous HARQ scheme in the DL, where data retransmission does not occur at a fixed time. In other words, when the BS receives, from the UE, HARQ NACK feedback for its initial transmission data, the BS freely determines the time of transmission of retransmission data according to a scheduling operation. The UE may buffer data determined as an error as a result of decoding the received data for a HARQ operation, and then perform combining with the next retransmission data.

When the UE receives a PDSCH carrying DL data transmitted from the BS in a subframe n, the UE transmits to the BS UL control information including HARQ ACK or NACK for the DL data in a subframe n+k through a PUCCH or PUSCH. Here, a k value may be specified differently according to FDD or TDD of the LTE system and its subframe configuration. For example, the k value is fixed to 4 for an FDD LTE system. For a TDD LTE system, the k value may vary according to a subframe configuration and a subframe number. Furthermore, when data is transmitted through a plurality of carriers, the k value may be applied differently according to a TDD configuration for each carrier.

Unlike downlink HARQ, the LTE system adopts a synchronous HARQ scheme in the UL, where data transmission occurs at a fixed time. In other words, the UL/DL timing relationship among a PUSCH that is a physical channel for UL data transmission, a PDCCH that is a DL control channel followed by the PUSCH, and Physical Hybrid Indicator Channel (PHICH) that is a physical channel on which downlink HARQ ACK/NACK corresponding to the PUSCH is transmitted may be defined according to the following rules.

When the UE receives the PDCCH carrying uplink scheduling control information transmitted from the BS in a subframe n or the PHICH carrying downlink HARQ ACK/NACK, the UE transmits the PUSCH carrying UL data corresponding to the uplink scheduling control information in a subframe n+k. Here, the k value may be defined differently for FDD or TDD of the LTE system and its configuration. For example, the k value may be fixed to 4 for an FDD LTE system. For a TDD LTE system, the k value may vary according to the subframe configuration and subframe number. When data is transmitted through a plurality of carriers, the k value may be applied differently according to a TDD configuration for each carrier.

When the UE receives the PHICH carrying information related to downlink HARQ ACK/NACK from the BS in a subframe i, the PHICH corresponds to the PUSCH transmitted by the UE in a subframe i-k. Here, the k value may be defined differently for FDD or TDD of the LTE system and its configuration. For example, the k value may be fixed to 4 for the FDD LTE system. For the TDD LTE system, the k value may vary according to the subframe configuration and subframe number. Furthermore, when data is transmitted through a plurality of carriers, the k value may be applied differently according to the TDD configuration for each carrier.

TABLE 2

PDCCH and PDSCH configured by C-RNTI

| Transmission mode | DCI format | Search space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity. |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity. |
| | DCI format 2B | UE specific by C-RNTI | Dual layer transmission, port 7 and port 8; or single antenna port, and port 4 or 8 |

Table 2 shows DCI format types supportable for each transmission mode under conditions set by the Cell-RNTI (C-RNTI) given in 3GPP TS 36.213. The UE assumes that a corresponding DCI format exists in a control region according to a preset transmission mode and performs detection and decoding. For example, when the UE receives an indication of transmission mode 8, the UE detects for DCI format 1A in a common search space and a UE-specific search space, while detecting for DCI format 2B only in the UE-specific search space. The above-described wireless communication system has been described with respect to the LTE system, and the description of the present disclosure is not limited to the LTE system but may be applied to various wireless communication systems such as NR and 5G systems. Furthermore, according to an embodiment, when the present disclosure is applied to other wireless communication systems, a k value may be changed and applied to a system using a modulation scheme corresponding to FDD.

Figure 3:
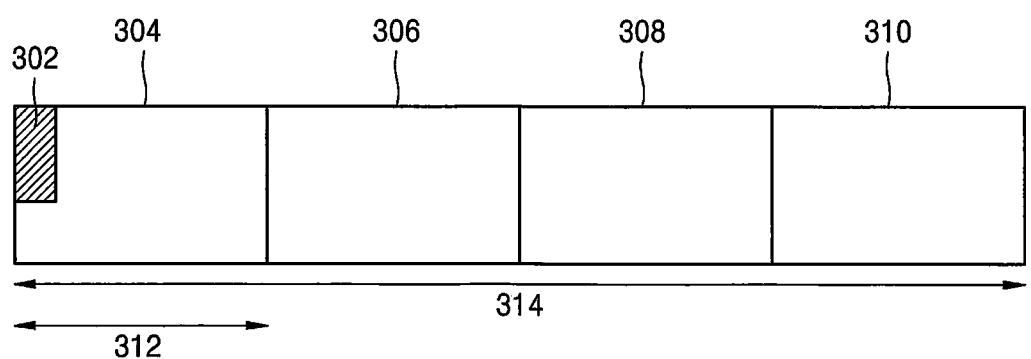
FIG. 3 illustrates slot structure information indicated by a slot format indicator, according to an embodiment.

FIG. 3 illustrates slot structure information indicated by a slot format indicator, according to an embodiment.

According to an embodiment, an SFI may be a technology applicable in a TDD environment in which the UL and DL may coexist in the same frequency band. A slot structure form for a period of one slot or several slots, which is indicated via an SFI, may be transmitted to one UE, a group of multiple UEs, or all UEs through a UE-specific, UE-group common, or common DL control channel. For example, the BS uses the SFI to inform the UE whether the entire slot is DL or UL for each individual slot in N slots, or whether a specific symbol is configured as DL or UL in units of symbols constituting one slot. The SFI may be transmitted via L1 signaling or higher-layer signaling such as radio resource control (RRC) signaling and medium access control channel element (MAC CE) signaling.

The BS may inform UEs about a table consisting of combinations of a DL or UL configured via higher-layer signaling in units of a slot or symbol, and indicate a specific value among values set in the table configured via higher-layer signaling to the UEs through UE common or UE-specific L1 signaling via which an SFI is transmitted. According to an embodiment, the table may be Table 3, Table 4, or Table 5, but is not limited to the examples of Tables 3 through 5.

TABLE 3

Example 1 of SFI configuration information

| No. | SFI configuration information |
| --- | --- |
| 1 | Combination 1 of DL, UL, and unknown |
| 2 | Combination 2 of DL, UL, and unknown |
| 3 | Combination 3 of DL, UL, and unknown |
| ... | ... |

TABLE 4

Example 2 of SFI configuration information

| No. | SFI configuration period (per slot) | SFI configuration information |
| --- | --- | --- |
| 1 | 1 | Combination 1 of DL, UL, and unknown |
| 2 | 1 | Combination 2 of DL, UL, and unknown |
| 3 | 10 | Combination 3 of DL, UL, and unknown |
| ... | ... | ... |

TABLE 5

Example 3 of SFI configuration information

| No. | SFI configuration information |
| --- | --- |
| 1 | Combination 1 of DL, UL, and unknown for specific SFI configuration period |
| 2 | Combination 2 of DL, UL, and unknown for specific SFI configuration period |
| 3 | Combination 3 of DL, UL, and unknown for specific SFI configuration period |
| ... | ... |

Furthermore, according to an embodiment, an SFI may indicate that there is an interval called unknown (the Korean term and its English equivalent hereinafter to be used interchangeably) that is not set to either UL or DL, in addition to information indicating whether a specific symbol or a specific slot is UL or DL. The unknown interval may be used for a reserved resource (the Korean term and its English equivalent hereinafter to be used interchangeably), which is a resource that the BS reserves for use in channel measurement or a future service, or be used for a gap used to switch from UL to DL (or from DL to UL). Referring to FIG. 3, the UE may receive the SFI information through a group-common or common DL control channel 302, and the SFI information may indicate UL, DL, and unknown information related to formats of the four slots 304, 306, 308, and 310 for each slot 312, each symbol, or a group of symbols. Although FIG. 3 shows an example in which the SFI information is transmitted in a period 314, i.e., every four (4) slots, but the value of N that is an arbitrary natural number may be set as the period 314. For example, the value of N may be 1, 2, 4, 5, 10, and 20. However, the value of N is not limited to the above example and may vary depending on a system configuration.

Figure 4:
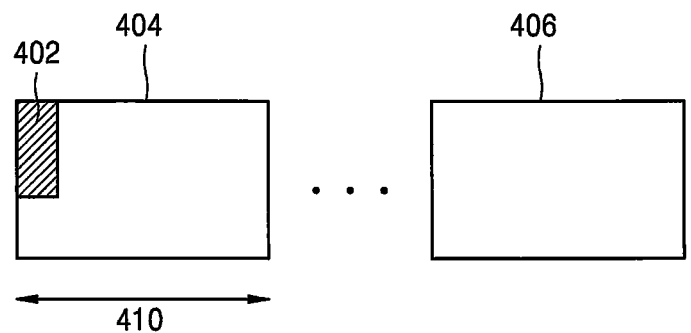
FIG. 4 is a diagram for explaining cross slot scheduling according to an embodiment.

FIG. 4 is a diagram for explaining cross slot scheduling according to an embodiment.

Referring to FIG. 4, the UE may detect for DCI indicating UL data scheduling or DL data scheduling through a UE-specific or UE common DL control channel 402. A slot in which the UL or DL data scheduling occurs and which is detected through the detection for DCI may be the same as a slot 404 where the DCI is transmitted or may be a slot 406 different from the slot 404.

According to an embodiment, cross-slot scheduling may refer to a case where UL or DL data is scheduled in a slot different from a slot where DCI is detected. In FIG. 4, reference numeral 410 may represent a slot unit. For example, UL data or DL data scheduled using DCI detected by the UE via a DL control channel in a k-th slot may be present in the k-th slot or k+n-th (or k-n-th) slot. An n value may be a slot unit, a symbol unit, or a unit composed of a combination of a slot and a symbol. The BS may pre-configure candidate values of n via higher-layer signaling.

The UE may determine the value of n by checking UL or DL data scheduling information for the UE through the DL control channel 402 and then identifying in which slot information about actual scheduled DL data reception or UL data transmission is generated (i.e., the value of n applied to actual scheduling), or may identify the value of n in DCI indicating data scheduling or the value of n separately configured via higher-layer signaling. The former is called a dynamic scheme, and the latter is called a semi-static scheme. According to the latter method, a single fixed value of n may be continuously applied, or after implicitly determining that an n value changes according to a value corresponding to a specific field (e.g., a length of a scheduled data region or an MCS value, or the number of code block groups or control information monitoring period) among fields constituting the control information, the corresponding value of n may be applied.

According to an embodiment, the UL or DL data transmission may be scheduled in units of symbols as well as in units of slots via the DCI. When the data transmission is scheduled in units of symbols or in a transmission unit having a length smaller than a slot, the value of n may be b (Here, b is 0 or any other value). When the transmission unit is the same as the slot, the value of n may be c (where c is 0 or any other value). When the transmission unit is larger than the slot, the value of n may be d (where d is 0 or any other value). All or some of the values of b, c, and d may be equal to or different from one another. According to an embodiment, a basic transmission unit may be a slot, a symbol, or a group of symbols.

Furthermore, according to an embodiment, when n is 0, unlike the cross-slot scheduling, DL or UL data scheduling may occur in a slot in which control information is generated. However, in a broad sense, cross slot scheduling of the present disclosure may also be applied when n is 0.

Figure 5:
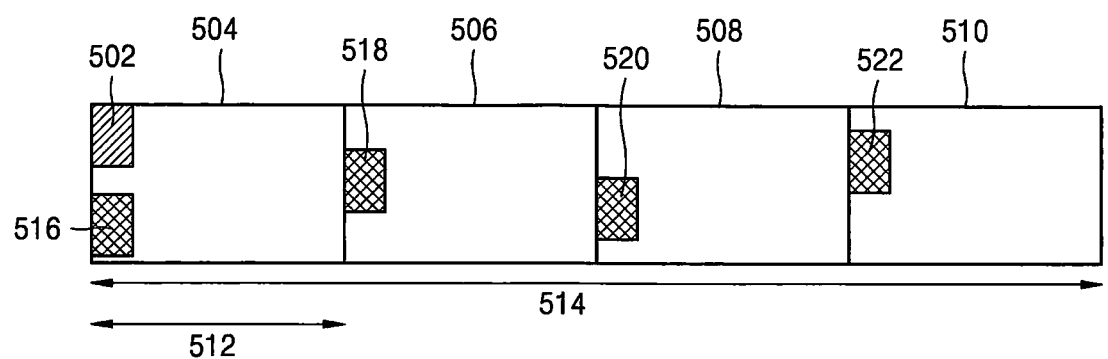
FIG. 5 illustrates a slot where slot format information and scheduling configuration information are provided, according to an embodiment.

FIG. 5 illustrates a slot where slot format information and scheduling configuration information are provided, according to an embodiment.

Referring to FIG. 5, a UE may receive an SFI transmitted through a UE common or UE-specific control channel 502 and determine whether to detect for DCI according to a slot configuration indicated by the SFI. For example, when a specific slot is indicated as a DL via the SFI, the UE may detect for DCI. Otherwise, when a specific slot is indicated as a UL or unknown through the SFI, the UE may not detect for DCI.

Furthermore, according to an embodiment, when a specific slot is configured as DL, unknown, and UL via the SFI, the UE may determine whether to detect for control information according to the corresponding slot configuration. For example, when DL exists in a preceding symbol of a specific slot, the UE may detect for control information. Otherwise, when DL exists in the middle of the slot, the UE may not detect for control information.

According to an embodiment, UE may be previously configured with UE-specific or UE common control channels 516, 518, 520, 522 for receiving information about DL or UL data scheduling indicated by higher-layer signaling. While FIG. 5 shows that in slot 1 504, the UE common or UE-specific control channel 502 for receiving the SFI is separate from and the UE-specific or UE common control channel 516 for receiving information about DL or UL data scheduling indicated by higher-layer signaling, the two UE common or UE-specific control channels 502 and 516 may share the same resource (or resources) unlike in FIG. 5.

According to an embodiment, when the SFI transmitted through the UE common or UE specific control channel 502 indicates slot 1 504, slot 2 506, and slot 4 510 as DL while indicating slot 3 508 as UL, the UE may perform detection for DCI only in the control channel 516 of the slot 1 504, the control channel 518 of the slot 2 506, and the control channel 522 of the slot 4 510. In other words, the UE may not detect for the control channel 520 of the slot 3 508 preconfigured via higher-layer signaling because the slot 3 508 carrying the control channel 520 via the SFI is changed to the UL.

As described with reference to FIG. 4, in a situation where cross-slot scheduling is possible, the UE may adaptively detect for DCI. For example, when the SFI indicates the slot 1 504 as DL and the slot 2 506 through slot 4 510 as UL, the UE may not detect for control information indicating DL scheduling according to an n value for cross-slot scheduling.

According to an embodiment, when candidate values of n in which DL data can be cross-slot scheduled are set to 1, 2, and 3, the cross-slot scheduled DL data that can be scheduled via DCI contained in the slot 1 504 may exist in the slot 2 506 through slot 4 510. However, because the UE previously acquired information indicating that the slot 2 506 to slot 4 510 are set to UL via the SFI, the UE may not detect for DCI used for scheduling DL data on the UE-specific or UE (group) common DL control channel 516 of the slot 1 504. Alternatively, the UE may detect for only DCI via which UL data is scheduled in the UE-specific or UE common DL control channel 516 of the slot 1 504.

According to an embodiment, when candidate values of n for which UL data can be cross-slot scheduled are set to 1 and 2, the cross-slot scheduled UL data that can be scheduled via DCI contained in the slot 1 504 may exist only in the slot 2 506 and the slot 3 508. Alternatively, cross-slot scheduled UL data that can be scheduled via DCI contained in the slot 2 506 may exist only in the slot 3 508 and the slot 4 510.

When the SFI indicates that the slot 1 504 through slot 3 508 are set to DL while the slot 4 510 is set to UL, the UE may not detect for DCI via which UL data is scheduled in the UE-specific or UE common DL control channel 516 of the slot 1 504. Furthermore, the UE may detect for DCI via which DL data is scheduled in the UE-specific or UE common DL control channel 516. Because the slot 4 510 is set to UL, the UE may detect for DCI via which UL data (or DL data) is scheduled in the control channel 518 of the slot 2 508.

According to an embodiment, when slots corresponding to values of n for which UL cross-slot scheduling is enabled in a UE-specific or UE common DL control channel in a specific slot are all configured as DL, the UE may detect for only control information indicating DL scheduling in the control channel or may not detect for control information indicating UL scheduling. When slots corresponding to values of n for which DL cross-slot scheduling is enabled in a UE-specific or UE common DL control channel in a specific slot are all configured as UL, the UE may detect for only control information indicating UL scheduling in the control channel or may not detect for control information indicating DL scheduling.

According to an embodiment, a slot configured as DL may mean that all symbols constituting the slot are DL symbols or that more than a specific number of symbols in the slot are DL symbols. A slot being configured as UL may mean that all symbols constituting the slot are UL symbols or that more than a specific number of symbols in the slot are UL symbols. However, embodiments are not limited to the above example. Furthermore, down control information may be DL control information, and down control channel may be a DL control channel. However, embodiments are not limited to the above example.

Figure 6:
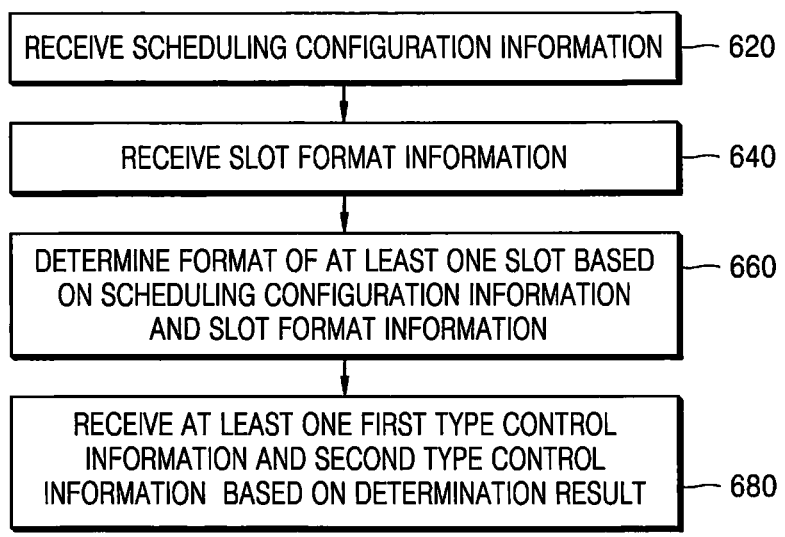
FIG. 6 is a flowchart of a method of receiving control information based on scheduling configuration information and slot format information, according to an embodiment.

FIG. 6 is a flowchart of a method of receiving control information based on scheduling configuration information and slot format information, according to an embodiment.

In operation 620, a UE may receive scheduling configuration information.

According to an embodiment, the scheduling configuration information may include information about the above-described cross-slot scheduling. The scheduling configuration information may include information about intervals of slots for which cross slot scheduling configuration is possible.

Furthermore, according to an embodiment, the scheduling configuration information may include information about the degree to which a slot interval unit between a slot for receiving UL or DL scheduling information and a slot for transmitting actually scheduled UL or DL data or a symbol interval unit may vary. However, embodiments are not limited to the above example, and the scheduling configuration information may include all pieces of information necessary for configurations related to scheduling for the UE.

In operation 640, the UE may receive slot format information.

According to an embodiment, the slot format information may include a SFI. However, embodiments are not limited to the above example, and the slot format information may include any type of information that can indicate a slot format.

In operation 660, the UE may determine a format of at least one slot based on the scheduling configuration information and the slot format information.

According to an embodiment, the UE may determine, based on the slot format information, a format of at least one slot available for UL or DL scheduling determined based on scheduling configuration information. For example, when slots k+1, k+2, and k+3 are available for UL or DL scheduling in a predetermined slot k, the UE may determine whether the slots k+1, k+2 and k+3 are set to UL or DL based on the slot format information.

Furthermore, according to an embodiment, in at least one of cases in which the slot format information includes information indicating that format information of a predetermined slot is unknown and in which the slot format information does not include the format information of the predetermined slot, the UE may determine a format of the predetermined slot as an unknown format. For example, when format information of a predetermined slot is not received or when the slot format information includes information indicating that a format of the predetermined slot is unknown, the UE may determine the format of the predetermined slot as an unknown format. However, embodiments are not limited to the above example.

In operation 680, the UE may receive or detect for at least one of first type control information and second type control information based on a result of the determining.

According to an embodiment, when a format of the at least one slot available for UL or DL scheduling is determined as the same format based on the slot format information, the UE may receive or detect for only one of the first type control information and the second type control information. According to an embodiment, the first type control information may be control information for scheduling UL data, and the second type control information may be control information for scheduling DL data. However, the first type control information and the second type control information are not limited to the above examples.

According to an embodiment, when formats of at least one slot available for DL scheduling are all determined as UL formats based on the slot format information, the UE may receive or detect for only the first type control information. The first type control information may be control information for scheduling UL data. However, the first type control information is not limited to the above example.

According to an embodiment, when formats of at least one slot available for UL scheduling are all determined as DL formats based on the slot format information, the UE may receive or detect for only the second type control information. According to an embodiment, the second type control information may be control information for scheduling DL data. However, the second type control information is not limited to the above example.

According to an embodiment, when it is determined, based on the slot format information, that formats of at least one slot available for UL scheduling are all UL formats or that formats of at least one slot available for DL scheduling are all DL formats, the UE may receive or detect for the first type control information and the second type control information. According to an embodiment, the first type control information may be control information for scheduling UL data, and the second type control information may be control information for scheduling DL data. However, the first type control information and the second type control information are not limited to the above examples.

Furthermore, according to an embodiment, when formats of two or more slots from among at least one slot available for UL or DL scheduling are determined as different formats based on the slot format information, the UE may receive the first type control information and the second type control information. According to an embodiment, the first type control information may be control information for scheduling UL data, and the second type control information may be control information for scheduling DL data. The first type control information and the second type control information are not limited to the above examples.

Furthermore, according to an embodiment, when the UE does not know the format of at least one slot among a predetermined number of slots available for UL or DL scheduling, the UE may receive the first type control information and the second type control information. According to an embodiment, the first type control information may be control information for scheduling UL data, and the second type control information may be control information for scheduling DL data. The first type control information and the second type control information are not limited to the above examples.

Figure 7:
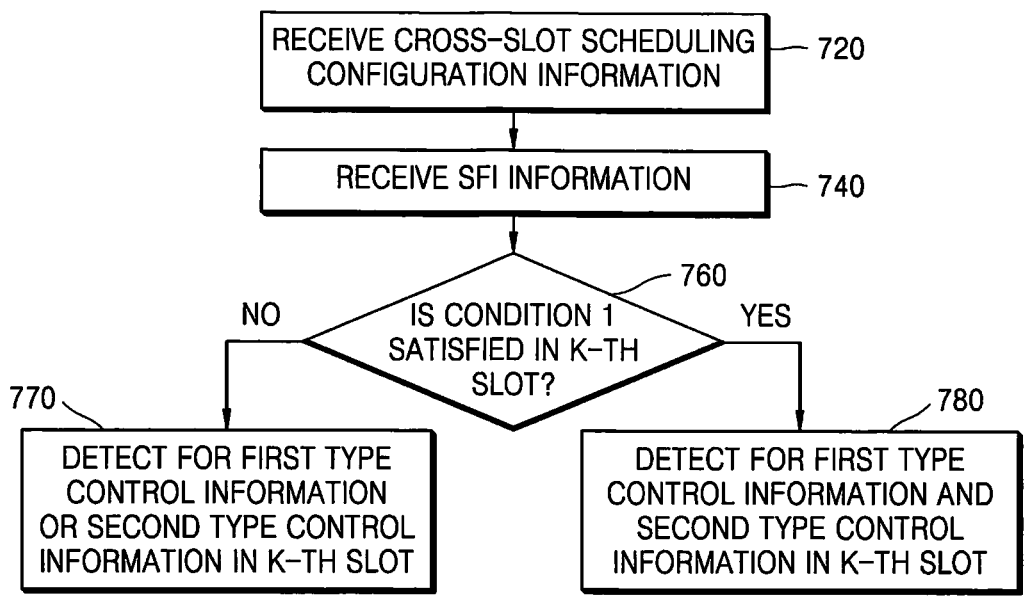
FIG. 7 is a detailed flowchart of a method of receiving adaptive control information according to scheduling configuration information and slot format information, according to an embodiment.

FIG. 7 is a detailed flowchart of a method of receiving adaptive control information according to scheduling configuration information and slot format information, according to an embodiment.

In operation 720, a UE may receive configuration information available for cross slot scheduling from a BS via higher-layer signaling. The configuration information may refer to a slot position n available for UL or DL data scheduling. For example, a slot available for scheduling UL or DL data through a DL control channel in a k-th slot may be a k+n-th slot, and n may have one or more values that can be configured via higher-layer signaling. When a plurality of values are configured via higher-layer signaling, the BS or UE may select one of n candidate values in control information indicating UL or DL data scheduling. For example, the UE may be configured using the following table (Table 6).

TABLE 6

Examples of values for cross-slot scheduling

| No. (Index) | Value of n |
|---|---|
| 1 | n1 |
| 2 | n2 |
| 3 | n3 |
| 4 | n4 |

In Table 6, the UE may select one of available values of n by using 2 bits in control information transmitted via L1 signaling. At least one of n1, n2, n3, and n4 may be set as a value of n through signaling. The unit of n, n1, n2, n3, n4 may be a slot, a symbol, or a group of symbols, and their values may be 0, positive, or negative. In operation 740, the UE may receive SFI information through a UE (group) common downlink control channel.

In operation 760, the UE may determine, based on the received SFI information, whether condition 1 for adaptive control information detection is satisfied in any k-th slot. According to an embodiment, factors for determining whether the condition 1 is satisfied may include slot configuration information indicated by the SFI and cross slot scheduling configuration information configured via higher signaling.

When the condition 1 is satisfied, in operation 770, the UE may detect for the first type control information or the second type control information in the k-th slot.

According to an embodiment, the condition 1 may include the following examples. When slots corresponding to candidate values of n available for DL data cross-slot scheduling are all set to UL by the SFI, the UE may detect for the first type control information. In this case, the first type control information may include a control information format for scheduling UL data. When slots corresponding to candidate values of n available for UL data cross slot scheduling are all set to DL by the SFI, the UE may detect for the second type control information. In this case, the second type control information may include a control information format for scheduling DL data.

When the condition 1 is not satisfied, in operation 780, the UE may detect for the first type control information and the second type control information in the k-th slot. When condition 1 is not satisfied, the first type control information may mean a control information format for scheduling UL data, and the second type control information may mean a control information format for scheduling DL data.

Figure 8:
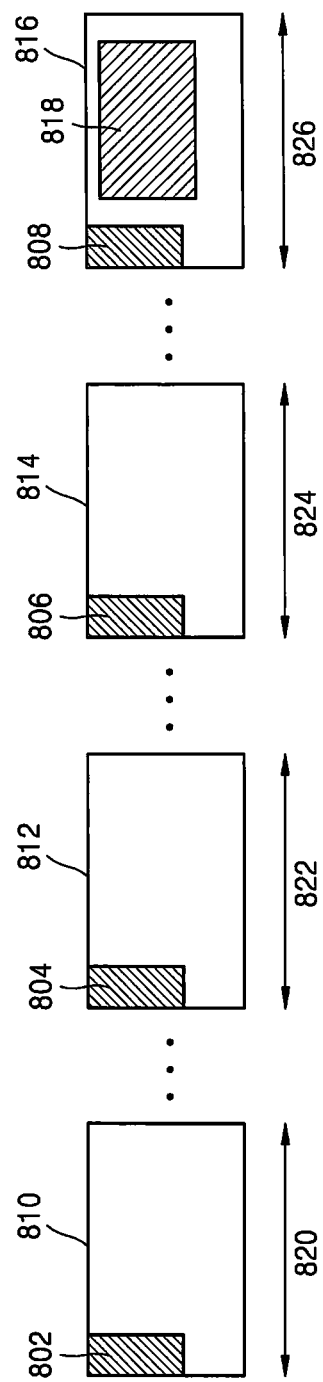
FIG. 8 is a diagram for explaining the number of available hybrid automatic repeat request (HARQ) processes according to an embodiment.

FIG. 8 is a diagram for explaining the number of available HARQ processes according to an embodiment.

Referring to FIG. 8, the UE may be configured with DCI search spaces 802, 804, 806, and 808 via higher-layer signaling. Reference numerals 820, 822, and 824, 826 may represent a slot unit, a symbol unit, or a symbol group unit. The UE may be configured with the number of HARQ processes for UL or DL data scheduling in advance via UE common or UE specific higher-layer signaling or may always use a value specified in a standard.

According to an embodiment, when the number of HARQ processes for DL data scheduling is 1, the UE may receive DL data in slot 1 810 and slot 2 812 through DL data scheduling in a DL control channel 802 present in the slot 1 810 and transmit a HARQ-ACK report for the DL data through a resource region 818 in slot 4 816. In this case, because there is no remaining HARQ process for DL data scheduling in DL control channels present in the slot 2 812 through slot 4 816, the UE may skip detection for control information indicating DL data scheduling. Alternatively, the UE may detect for only control information indicating UL data scheduling.

According to an embodiment, when the number of HARQ processes for UL data scheduling is 1, the UE may transmit UL data in the slot 1 810, the slot 2 812, or the slot 3 814 through UL data scheduling in the DL control channel 802 present in the slot 1 810. When the UE transmits the UL data in the slot 3 814, the UE may skip detection for control information indicating UL data scheduling through downlink control channels 804 and 806 that exist until the UE transmits the UL data.

In other words, the UE may determine whether to detect for control information indicating scheduling of uplink or downlink data in a downlink control channel present in a specific slot according to the number of remaining HARQ processes. According to an embodiment, in case of DL data scheduling, the number of remaining HARQ processes may mean the number of HARQ processes available for the DL data scheduling. The UE may not expect to receive DL data scheduling with a predetermined number of HARQ processes until a HARQ-ACK feedback is reported for the predetermined number of HARQ processes via the DL data scheduling. In case of UL data scheduling, the number of remaining HARQ processes may mean the number of HARQ processes available for the UL data scheduling. The UE may not expect to receive UL data scheduling with a predetermined number of HARQ processes until UL data transmissions corresponding to the predetermined number of HARQ processes via the UL data scheduling are performed.

According to an embodiment, when there is no remaining HARQ process for UL scheduling in a DL control channel present in a specific slot, the UE may skip (not expect to perform) detection for a control information format that can indicate the UL scheduling. In other words, the UE may skip detection for a control information format that can indicate UL scheduling in a situation where all available HARQ processes are already used for scheduling and UL data transmissions corresponding to all the HARQ processes are not yet performed.

Furthermore, according to an embodiment, when there is no remaining HARQ process for DL scheduling in a DL control channel present in a specific slot, the UE may skip (not expect d to perform) detection for a control information format that can indicate the UL scheduling. In other words, when all available HARQ processes are already used for scheduling and HARQ-ACK feedbacks corresponding to all the HARQ processes are not yet transmitted, the UE may skip detection for a control information format that can indicate DL scheduling.

Figure 9:
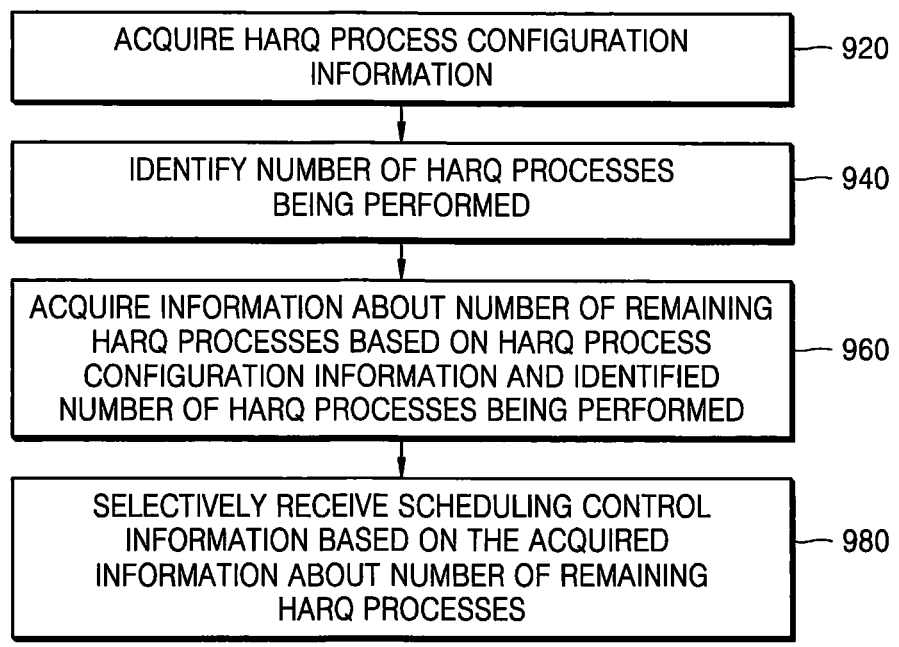
FIG. 9 is a flowchart of a method of receiving control information based on the number of remaining HARQ processes according to an embodiment.

FIG. 9 is a flowchart of a method of receiving control information based on the number of remaining HARQ processes, according to an embodiment.

In operation 920, the UE may acquire HARQ process configuration information.

According to an embodiment, the HARQ process configuration information may include information about a period of a HARQ process for DL or UL data scheduling. Furthermore, the HARQ process configuration information may include the number of HARQ processes that can be performed by the UE in parallel.

According to an embodiment, the HARQ process configuration information may be previously configured via UE common or UE-specific higher-layer signaling (e.g., via an RRC parameter) or may always use a value specified in the standard. Furthermore, the HARQ process configuration information may also be received via a DL control channel. In addition, according to an embodiment, the UE may acquire the HARQ process configuration information based on at least one of performance information of the UE and information received from the BS.

In operation 940, the UE may identify the number of HARQ processes being performed.

According to an embodiment, the UE may identify the number of HARQ processes currently being performed based on whether a HARQ-ACK feedback or UL data is transmitted. When UL data is not transmitted in a HARQ process corresponding to predetermined UL scheduling or when a HARQ-ACK feedback is not transmitted in the HARQ process corresponding to the predetermined downlink scheduling, the UE may determine that the HARQ process is being performed. The UE may determine how many HARQ processes are being performed.

In operation 960, the UE may acquire information about the number of remaining HARQ processes based on the HARQ process configuration information and the identified number of HARQ processes being performed.

According to an embodiment, the UE may acquire at least one of information about the period of the HARQ process and the number of HARQ processes that can be performed in parallel via the HARQ process configuration information acquired in operation 920, and acquire the information about the number of HARQ processes currently being performed in operation 940. Accordingly, the UE may acquire the information about the number of remaining HARQ processes.

According to an embodiment, the information about the number of remaining HARQ processes may include information about how many HARQ processes are currently available.

In operation 980, the UE may selectively receive or detect for scheduling control information based on the acquired information about the number of remaining HARQ processes.

According to an embodiment, the UE may receive or detect for control information when the number of remaining HARQ processes is 1 or more. If the number of remaining HARQ processes is 0, the UE may not receive or detect for the control information.

Figure 10:
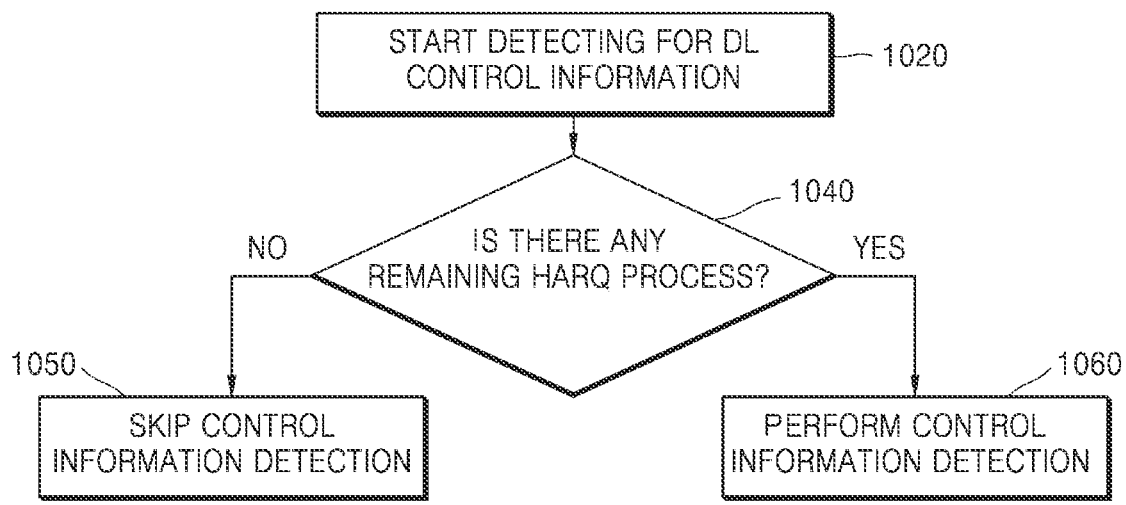
FIG. 10 is a detailed flowchart of a method of receiving control information based on the number of remaining HARQ processes, according to an embodiment.

FIG. 10 is a detailed flowchart of a method of receiving control information based on the number of remaining HARQ processes, according to an embodiment In operation 1020, the UE may start detecting for control information through a UE specific or UE common downlink control channel pre-configured via higher-layer signaling.

In operation 1040, the UE may check the presence or absence of the remaining HARQ process for DL or UL data scheduling.

When there is no remaining HARQ process (i.e., there is no HARQ process available for scheduling), in operation 1050, the UE may not detect for control information indicating DL data scheduling or control information indicating UL data scheduling.

For example, if n HARQ processes are available for DL data scheduling, when the whole process of DL data scheduling is performed using the n HARQ processes and then even at least one HARQ-ACK feedback for DL data scheduled via the corresponding HARQ processes is not transmitted by the UE, the number of available (remaining) HARQ processes for the DL data scheduling may be zero.

Furthermore, if n HARQ processes are available for UL data scheduling, when the whole process of UL data scheduling is performed using the n HARQ processes and then even at least one UL data transmission for UL data scheduled via the corresponding HARQ processes is not performed by the UE, the number of available (remaining) HARQ processes for the UL data scheduling may be zero. In this case, the UE may adaptively skip detection for control information indicating UL or DL data scheduling.

When there is at least one remaining HARQ process (i.e., at least one HARQ process is available for scheduling), in operation 1060, the UE may detect for control information indicating DL data scheduling or UL data scheduling.

For example, if n HARQ processes are available for DL data scheduling, when even at least one HARQ-ACK feedback for DL data scheduled via the corresponding HARQ processes has already been transmitted by the UE, the number of available (remaining) process for the DL data scheduling may be 1 or more.

Furthermore, if n HARQ processes are available for UL data scheduling, when even at least one UL data transmission for UL data scheduled via the corresponding HARQ processes is performed by the UE, the number of available (remaining) HARQ processes for the UL data scheduling may be 1 or more.

Figure 11:
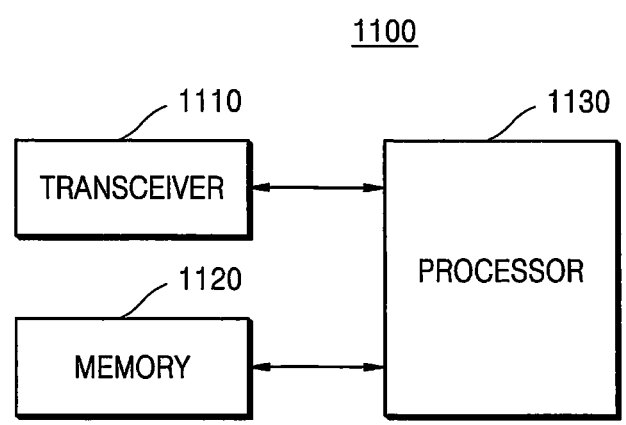
FIG. 11 is a block diagram of a structure of a terminal according to an embodiment.

FIG. 11 is a block diagram of a structure of a UE 1100 according to an embodiment.

Referring to FIG. 11, the UE 1100 according to the present disclosure may include a transceiver 1110, a memory 1120, and a processor 1130. According to the above-described communication method by the UE 1100, the transceiver 1110, the memory 1120, and the processor 1130 of the UE 1100 may operate. However, components of the UE 1100 are not limited thereto. For example, the UE 1100 may include more or fewer components than those described above. Furthermore, the transceiver 1110, the memory 1120, and the processor 1130 may be implemented as a single chip. The processor 1130 may be configured as at least one processor.

The transceiver 1110 may transmit or receive signals from or to a BS. Here, the signals may include control information and data. To do so, the transceiver 1110 may include an RF transmitter for up-converting and amplifying a frequency of a signal to be transmitted and an RF receiver for low-noise amplifying a received signal and down-converting its frequency. However, this is merely an example of the transceiver 1110, and the components of the transceiver 1110 are not limited to the RF transmitter and the RF receiver.

Furthermore, according to an embodiment, the transceiver 1110 may receive a signal via a radio channel and output the signal to the processor 1130 and transmit a signal output from the processor 1130 via a radio channel.

According to an embodiment, the memory 1120 may store data and programs necessary for operations of the UE 1100. Furthermore, the memory 1120 may store control information or data in a signal transmitted or received by the UE 1100. The memory 1120 may be composed of storage media, such as read-only memory (ROM), random access memory (RAM), hard discs, compact disc (CD)-ROM, and digital versatile discs (DVDs), or a combination thereof.

According to an embodiment, the processor 1130 may control a series of processes such that the UE 1100 may operate according to the above embodiments. For example, the transceiver 1110 may receive cross slot scheduling configuration information and SFI information, and the processor 1130 may determine whether slots corresponding to candidate values of n available for DL data cross-slot scheduling in a k-th slot are all set to UL by an SFI or slots corresponding to candidate values of n available for UL data cross-slot scheduling are all set to DL by the SFI. According to a result of the determining, the processor 1130 may control the transceiver 1110 to detect for first type control information or second type control information, or to detect for the first type control information and the second type control information.

Furthermore, when the transceiver 1110 detects for DCI, the processor 1130 may determine whether there is any remaining HARQ process and control the transceiver 1110 to perform or skip detection for control information.

Figure 12:
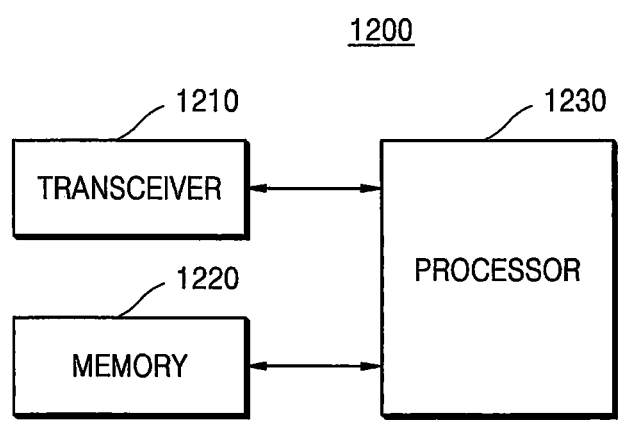
FIG. 12 is a block diagram of a structure of a base station, according to an embodiment.

FIG. 12 is a block diagram of a structure of a BS 1200, according to an embodiment.

Referring to FIG. 12, the BS 1200 according to the present disclosure may include a transceiver 1210, a memory 1220, and a processor 1230. According to the above-described method of communication between the UE 1100 and the BS 1200, the transceiver 1210, the memory 1220, and the processor 1230 of the BS 1200 may operate. However, components of the BS 1200 are not limited thereto. For example, the BS 1200 may include more or fewer components than those described above. Furthermore, the transceiver 1210, the memory 1220, and the processor 1230 may be implemented as a single chip. The processor 1230 may be configured as at least one processor.

The transceiver 1210 may transmit or receive signals from or to the UE 1100. Here, the signals may include control information and data. To do so, the transceiver 1210 may include an RF transmitter for up-converting and amplifying a frequency of a signal to be transmitted and an RF receiver for low-noise amplifying a received signal and down-converting its frequency. However, this is merely an example of the transceiver 1210, and the components of the transceiver 1210 are not limited to the RF transmitter and the RF receiver.

Furthermore, according to an embodiment, the transceiver 1210 may receive a signal via a radio channel and output the signal to the processor 1230 and transmit a signal output from the processor 1230 via a radio channel.

According to an embodiment, the memory 1220 may store data and programs necessary for operations of the BS 1200. Furthermore, the memory 1220 may store control information or data in a signal transmitted or received by the BS 1200. The memory 1220 may be composed of storage media, such as ROM, RAM, hard discs, CD-ROM, and DVDs, or a combination thereof.

The processor 1230 may control a series of processes such that the BS 1200 may operate according to the above embodiments. For example, the processor 1230 may control the transceiver 1210 to provide the UE 1100 with at least one of scheduling configuration information, slot format information, and HARQ process configuration information. Furthermore, the processor 1230 may process scheduling information and control the transceiver 1210 to provide DCI including scheduling information to the UE 1100.

According to the determination result, the processor 1130 may control the transceiver 1110 to detect for the first type control information or the second type control information, or to detect for the first type control information and the second type control information. It is obvious to those of ordinary skill in the art that other modifications may be made based on the technical spirit of the disclosure without departing from the scope of the disclosure. The embodiments of the disclosure may be combined with each other for operation when necessary. For example, an embodiment of the disclosure may be combined with parts of other embodiments of the disclosure to operate the BS and the UE. Other modifications based on the technical spirit of the embodiments of the disclosure may be implementable.

Although preferred embodiments of the disclosure have been described using specific terms, the specification and drawings are to be regarded in an illustrative rather than a restrictive sense in order to help understand the present disclosure Other modifications based on the technical spirit of the embodiments of the disclosure may be implementable.

The invention claimed is:

1. A method performed by a user equipment in a wireless communication system, the method comprising:
   receiving, from a base station, scheduling configuration information comprising information about intervals of slots for which cross-slot scheduling configuration is possible;
   receiving, from the base station, slot format information;
   based on the slot format information, determining formats of one or more slots available for transmitting uplink data or downlink data scheduled by first control information for scheduling the uplink data or second control information for scheduling the downlink data in a slot different from the one or more slots,
   wherein the one or more slots are configured by the scheduling configuration information;
   in case that the formats are set to an uplink, detecting only for the first control information from among the first control information and the second control information; and
   in case that the formats are set to a downlink, detecting only for the second control information from among the first control information and the second control information.

2. The method of claim 1, further comprising:
   when a format of at least one slot among a predetermined number of slots available for transmitting the uplink data or the downlink data is unknown, detecting for the first control information and the second control information.

3. The method of claim 2, wherein determining the formats comprises, in at least one of cases in which the slot format information includes information indicating that a format of a predetermined slot is unknown and in which the slot format information does not include information about the format of the predetermined slot, determining the format of the predetermined slot as an unknown format.

4. A method of receiving control information, the method comprising:
   acquiring hybrid automatic repeat request (HARQ) process configuration information including a number of HARQ processes for scheduling;
   identifying a number of HARQ processes currently being performed;
   determining information about the number of remaining HARQ processes based on the HARQ process configuration information and the identified number of HARQ processes being performed; and
   selectively receiving scheduling control information based on the determined information about the number of remaining HARQ processes.

5. The method of claim 4, wherein acquiring the HARQ process configuration information comprises acquiring the HARQ process configuration information based on at least one of performance information of a user equipment and information received from a base station.

6. The method of claim 4, wherein identifying the number of HARQ processes currently being performed comprises identifying the number of HARQ processes currently being performed based on whether HARQ acknowledgement (HARQ-ACK) or uplink data is transmitted.

7. The method of claim 4, wherein selective receiving the scheduling control information comprises receiving control information when the number of remaining HARQ processes is 1 or more.

8. A user equipment for receiving control information in a wireless communication system, the user equipment comprising:
   a transceiver configured to communicate with a base station; and
   a processor configured to:
      receive, from the base station, scheduling configuration information comprising information about intervals of slots for which cross-slot scheduling configuration is possible;
      receive, from the base station, slot formation information;
      based on the slot format information, determine formats of one or more slots available for transmitting uplink data or downlink data scheduled by first control information for scheduling the uplink data or second control information for scheduling the downlink data in a slot different from the one or more slots,
      wherein the one or more slots are configured by the scheduling configuration information;
      in case that the formats are set to an uplink, detect only for the first control information from among the first control information and the second control information; and
      in case that the formats are set to a downlink, detect only for the second control information from among the first control information and the second control information.

9. The user equipment of claim 8, wherein the processor is further configured to detect for the first control information and the second control information when the formats are determined as different formats based on the slot format information.

10. A user equipment for receiving control information in a wireless communication system, the user equipment comprising:
- a transceiver configured to communicate with a base station; and
- a processor configured to:
    - acquire hybrid automatic repeat request (HARQ) process configuration information including a number of HARQ processes for scheduling;
    - identify a number of HARQ processes currently being performed;
    - determine information about the number of remaining HARQ processes based on the HARQ process configuration information and the identified number of HARQ processes being performed; and
    - selectively receive scheduling control information based on the determined information about the number of remaining HARQ processes.

* * * * *